Sept. 8, 1931.  R. A. LINCOLN  1,822,628
WEIGHT INDICATOR
Original Filed July 31, 1924  2 Sheets-Sheet 1
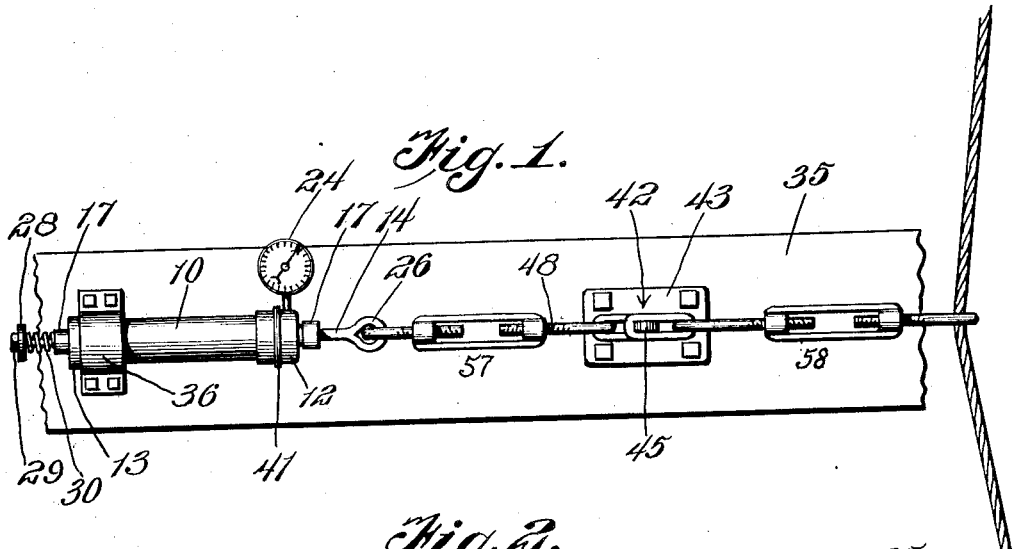
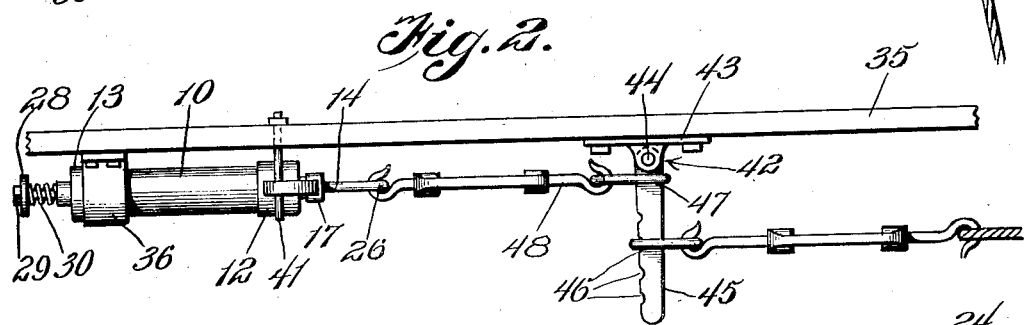
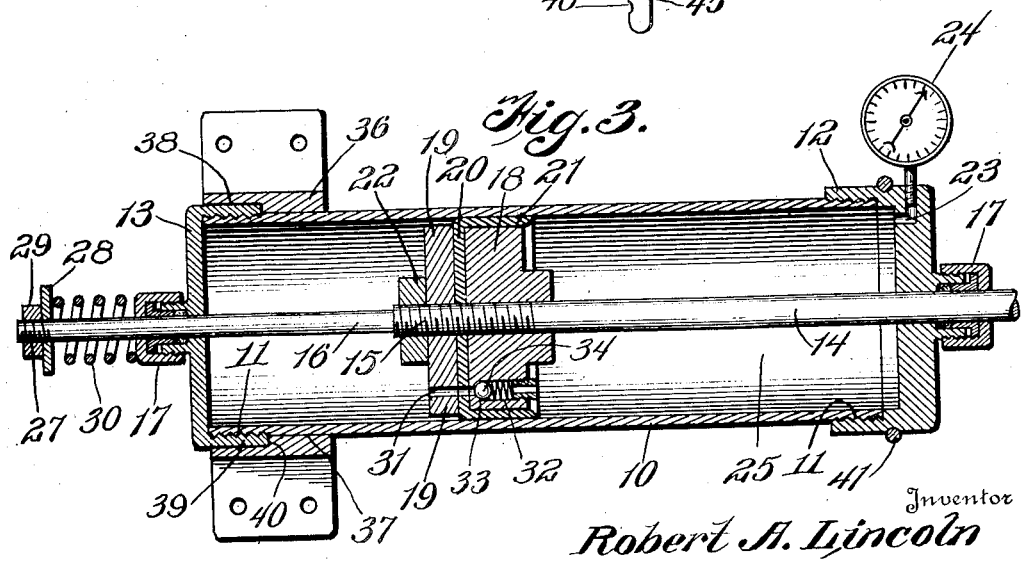
Inventor
Robert A. Lincoln
Watson E. Coleman
Attorney Sept. 8, 1931.  R. A. LINCOLN  1,822,628
WEIGHT INDICATOR
Original Filed July 31, 1924   2 Sheets-Sheet 2
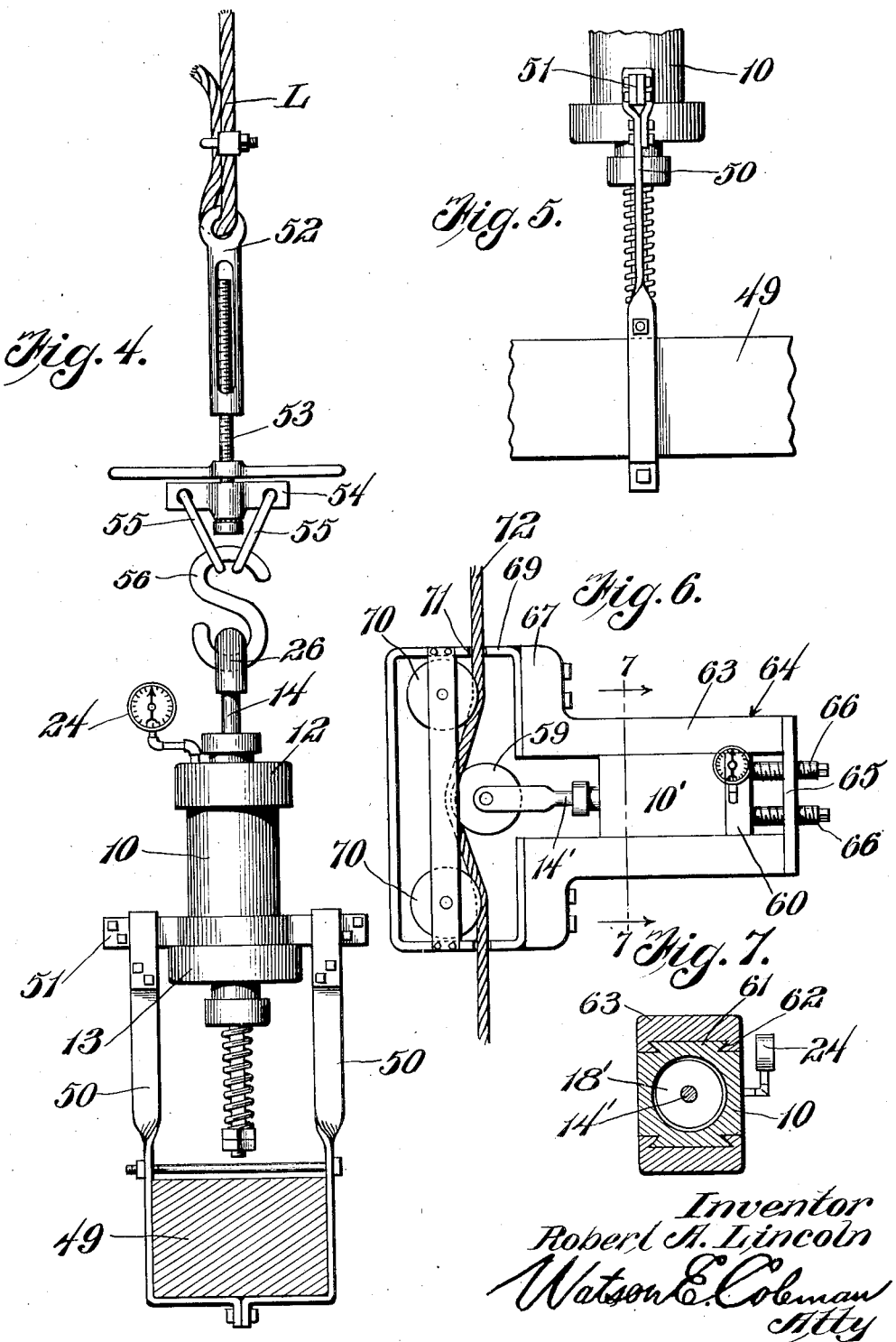
Inventor
Robert A. Lincoln
Watson E. Coleman
Atty Patented Sept. 8, 1931

1,822,628

UNITED STATES PATENT OFFICE

ROBERT A. LINCOLN, OF TONKAWA, OKLAHOMA, ASSIGNOR OF ONE-HALF TO AMERICAN IRON & MACHINE WORKS, INC., OF TONKAWA, OKLAHOMA, A CORPORATION OF OKLAHOMA

WEIGHT INDICATOR

Application filed July 31, 1924, Serial No. 729,340. Renewed March 20, 1928.

This invention relates to weight indicators for use in connection with rotary well drilling apparatus and more particularly to a device of this character which will be extremely simple and durable in its construction and which may be readily transported from place to place, thereby meeting the three greatest requirements of such an article employed in the oil fields.

A further object of the invention is to provide a device of this character which is capable of use with the pulling apparatus of a rotary well drilling rig and which has in combination therewith means for compensating for changes in the number of pulling lines employed in the rig, it being the common practice among drillers to employ as few lines as possible on this pulling apparatus due to the saving of time effected in pulling the drill pipe during early drilling operations by the use of a small number of lines.

A still further object of the invention is to provide a novel construction of recording instrument of this character.

These and other objects I attain by the construction shown in the accompanying drawings, wherein for the purpose of illustration is shown a preferred embodiment of my invention and wherein:—

Figure 1 is a side elevation of a weight indicator constructed in accordance with my invention, showing the same applied to the headboard and dead line of a derrick;

Figure 2 is a plan view thereof;

Figure 3 is an enlarged sectional view through the indicating cylinder proper.

Figs. 4 and 5 are views of a modified form of the invention.

Figs. 6 and 7 are views of a further modification.

Referring now more particularly to the drawings, the numeral 10 indicates a cylinder, the exterior of which is threaded at opposite ends, as indicated at 11, for the reception of heads 12 and 13. A piston rod 14 is provided having a central threaded portion 15, the rod at one side of the threaded portion being reduced as indicated at 16. The ends of the rod are directed through stuffing boxes 17 formed on the heads 12 and 13. Upon the threaded portion 15 of the rod is mounted a pair of plates 18 and 19 between which is received a cup washer 20, the flange 21 of which is directed toward that end of the cylinder bearing the head 12 and through which the larger end of the piston rod extends. These plates 18 and 19 are held in position by a lock nut 22.

The head 12 is provided with a port 23 communicating with a pressure gauge 24 of any suitable construction. The space between the piston and this head 12 is filled with oil, as indicated at 25, or with any other suitable fluid. The large end of the rod is formed with an eye 26 or other means of providing a connection with the hoisting apparatus as hereinafter more fully set forth. The small end of the rod has its extremity threaded, as at 27, and has mounted thereon a washer 28 held in position by a nut 29 mounted upon this threaded portion 27. Between the washer 28 and the head, more specifically in the present instance the stuffing box 17 of the head, a spring 30 is disposed, normally urging the small end of the rod outwardly and accordingly urging the piston toward the head 13. This piston has formed in the plates thereof aligned bores 31 and 32, the bore 32 being formed to provide a valve seat 33 against which is engaged a spring-pressed check valve 34 sealing the bore during movement of the piston toward the head 12. During movement of the piston in the opposite direction, under the influence of the spring 30, this check valve opens to permit any of the fluid which may have leaked past the piston to pass into the space between the piston and the head 12.

In the use of the device the cylinder may be mounted upon the headboard 35 of the derrick, as shown in Figures 1 and 2. Any suitable means may be employed for attaching the cylinder, but it is preferred that a casting 36 be provided which may be bolted to the cylinder and which casting has a bore 37 closely fitting the exterior of the cylinder. This bore is enlarged at one end, as at 38, to the diameter of the flange 39 of the head 13, so that this head partially fits within the casting and the end of the flange abutting the shoulder 40 formed at the end of the bore will limit movement of the cylinder through the bore. The opposite end of the cylinder is preferably secured into place by a U-bolt 41 engaging around the head 12 and bolted through the headboard 35.

Between the hoisting apparatus and the instrument, means 42 are provided for connecting the same, and in the form shown in Figures 1 and 2 for compensating for changes in the number of pulling lines employed in the pulling apparatus. This means in the present instance is shown as including a plate 43 which is secured to the headboard 35 and has pivoted thereto, as at 44, a lever 45. This lever has means for attaching the hoisting line thereto, illustrated as a plurality of notches 46 in which the connection to the hoisting line may be interchangeably engaged and disposed at one side of the lever. At the opposite side of the lever is formed a notch 47 engaged by one end of a connecting element 48, the opposite end of which is engaged in the eye 26. It will be obvious that by changing the point of engagement of the hoisting element with the lever, the leverage exerted will be changed to compensate for the changing leverage resulting from a change in the number of lines employed in the hoisting apparatus.

In the form shown in Figures 4 and 5 I have illustrated a different mounting and different manner of connection for the cylinder of the instrument. In this form the cylinder is attached to the sill 49 by means of clamping straps 50, the ends of which engage the outstanding portions of a two-part yoke 51 embracing the cylinder 10 immediately above the head 13 thereof. To the dead-line or pulling-line of the derrick hoisting apparatus, indicated at L, one end of a threaded sleeve 52 is secured into the opposite end of which is threaded a lever screw 53 which is swiveled in a support 54. From the support 54 links 55 extend for engagement with one end of a double hook 56, the opposite end of which is engaged with the eye 26 of the piston rod 14. In the use of this type of apparatus, when the pressure indicated upon the the gauge 24 becomes too great and it is indicated that too great a portion of the weight of the drilling string is being supported from the hoisting apparatus, the lever screw 53 is operated to permit this drilling apparatus to lower. In the form shown in Figures 1 and 2 this is, of course, accomplished by adjustment of the turn buckles 57 and 58 located in the connection between the eye 26 and the lever 45 and the pulling-line L respectively.

In the form shown in Figures 6 and 7 both the construction of the pressure cylinder and the manner of its connection with the pulling-line are modified. In this form the cylinder 10' has arranged therein a piston 18' similar to the piston in the form shown in Figures 1 to 5 and more particularly in Figure 3, but the rod 14' of this cylinder extends through only one end of the cylinder and has at its end a grooved pulley wheel 59. This cylinder has preferably but one removable head 60 in which the gauge is mounted, this head being fairly heavy in construction, and the walls of the cylinder and head have formed thereon dove-tails 61 at opposite sides which engage in dove-tail grooves 62 formed in the arms 63 of a U-shaped yoke 64. The head 60 of the cylinder opposes the bight portion 65 of the yoke and through this bight portion adjusting screws 66 are directed to engage the head and force the cylinder in one direction along the grooves. The ends of the arms 63 of the yoke are provided with angular projections 67 to which is bolted, as at 68, a casing 69 having one open side. Within this casing are rotatably supported a pair of grooved sheaves 70 which when the casing is bolted to the yoke are in alignment with the sheave 59 of the piston rod 14'. The upper and lower end walls of the casing have formed therein notches 71 through which the line 72 may be introduced. This line in this instance may be either the dead-line of the hoisting apparatus or the actual supporting line and in the latter case the device acts as a spooling guide for the line. In the use of this form of my invention the line is introduced through the notches and engaged in the pulleys 70. The screws 66 are then tightened to kink the line between the pulleys 70 by its engagement with the pulley 59 and the line in its tendency to straighten places pressure against the pulley 59 and accordingly the piston 18', with the result that the gauge, indicated at 24', gives a reading in accordance with the pressure to which this piston is subjected.

Since the construction of both the cylinder and connecting apparatus as above described is capable of a considerable range of change and modification without materially departing from the spirit of my invention, I do not limit myself to such specific structure except as hereinafter claimed.

Where in the appended claims a line of the hoisting apparatus is referred to the reference thereto is made in a generic sense to mean either the dead line or the hoisting line.

Whether the line deflecting device of the present invention is connected with the pulling line or the dead line, the deflection takes place between two fixed points, one point being the usual crown block pulley at the top of the derrick, and the other point being either the usual drum on the derrick from which the pulling line is run off, in the case of the pulling line, or the point of anchoring to the sill or derrick floor in the case of the dead line being deflected.

I claim:—

1. In a weight indicator for rotary drilling outfits, indicating means, a cylinder, a piston within the cylinder, a fluid within the cylinder between the piston and one end of the cylinder, the piston having a rod projecting through said end of the cylinder, a lever with which said rod is connected, and means adapted to connect said lever with a dead line of hoisting mechanism, said means being adjustable longitudinally of the lever, said lever being pivoted at one end and having a notch formed in one side thereof with which said rod is engaged, the opposite side thereof being provided with a plurality of spaced notches with which the said line is interchangeably connectible.

2. In a weight indicator for rotary drilling outfits, indicating means, a cylinder, a piston within the cylinder, a fluid within the cylinder between the piston and one end of the cylinder, the piston having a rod projecting through said end of the cylinder, a lever with which said rod is connected, means adapted to connect said lever with a dead line of hoisting mechanism, said means being adjustable longitudinally of the lever, means urging said piston toward the opposite end of the cylinder, and means for permitting passage of fluid which has leaked past the piston to such opposite end to pass through the piston.

3. In a weight indicator of the character described, a cylinder, heads engaged with opposite ends of the cylinder, a piston operating within the cylinder and having packing means engaging the walls of the cylinder, a check valve in the piston and opening toward one side thereof, a fluid within the cylinder between said side and the opposed head of the cylinder, a gauge communicating with the interior of the cylinder at said end, a rod for the piston projecting through opposite heads of the cylinder, the end of the rod projecting through the first named head having means for attaching thereto a hoisting line, and means at the opposite end of the rod for urging the piston toward the other head of the cylinder.

4. In a weight indicator of the character described, a cylinder, heads engaged with opposite ends of the cylinder, a piston operating within the cylinder and having packing means engaging the walls of the cylinder, a check valve in the piston and opening toward one side thereof, a fluid within the cylinder between said side and the opposed head of the cylinder, a gauge communicating with the interior of the cylinder at said end, a rod for the piston projecting through opposite heads of the cylinder, the end of the rod projecting through the first named head having means for attaching thereto a hoisting line, means at the opposite end of the rod for urging the piston toward the other head of the cylinder, said heads being of greater external diameter than said cylinder, a casting having a bore of the same diameter as the cylinder and through which the cylinder is directed, the bore at one end having an enlargement receiving the head at one end of the cylinder, means for attaching the casting to a support, and means for attaching the opposite end of the cylinder to a support.

5. In a weight indicator for rotary drilling outfits, a cylinder, a piston within the cylinder, a fluid within the cylinder between the piston and one end of the cylinder, a gauge in communication with the cylinder between the piston and said end, the piston having a rod projecting through said end of the cylinder, and a longitudinally extensible connection between the piston and the line of the hoisting mechanism.

6. In a weight indicator for rotary drilling outfits, a cylinder, a piston within the cylinder, a fluid within the cylinder between the piston and one end of the cylinder, a gauge in communication with the cylinder between the piston and said end, the piston having a rod projecting through said end of the cylinder, a longitudinally extensible connection between the piston and the line of the hoisting mechanism, the cylinder having heads of greater size than the body thereof, and means for attaching the cylinder to a fixed part of the derrick of the drilling outfit including a yoke secured to such fixed part and embracing the cylinder between the heads thereof.

7. In a weight indicator for well drilling apparatus, a cylinder and piston, means between the piston and a dead line of hoisting mechanism, which is adapted to engage an intermediate stretch of said line and normally deflect it from its straight course, said line under its tendency to straighten out due to pull thereon moving the piston to effect an indication, and extensible means of adjustment to allow said line to straighten out and lower the apparatus when the indicator shows excessive pressure, substantially as described.

8. In a weight indicator for well drilling apparatus, an indicator, a cylinder and piston for operating the indicator, a connection between the piston and a dead line of hoisting mechanism whereby the piston is adapted to be subject to the pull of said line, and means of adjustment in said connection whereby the apparatus may be lowered and the indicator restored to normal when the indicator shows excessive pressure, substantially as described.

9. In well drilling apparatus, a line to be connected with the drill, means located off to one side of the line and connected therewith to deflect a portion of the line laterally, said means including a member subject to the stress incident to the tendency of the line to straighten out under the weight of the drilling apparatus, an indicator associated with said means to indicate the degree of said stress and means for adjusting the said means to allow the said line to straighten out and the drilling apparatus thus to be lowered into the well.

In testimony whereof I hereunto affix my signature.

ROBERT A. LINCOLN.